United States Patent
Sun

(10) Patent No.: US 10,812,465 B2
(45) Date of Patent: Oct. 20, 2020

(54) METHOD FOR LOGGING INTO ACCOUNT ON MOBILE DEVICE, MOBILE DEVICE, AND NON-TRANSITORY COMPUTER READABLE STORAGE MEDIUM

(71) Applicant: Hisense Mobile Communications Technology Co., Ltd., Qingdao (CN)

(72) Inventor: Zhe Sun, Qingdao (CN)

(73) Assignee: HISENSE MOBILE COMMUNICATIONS TECHNOLOGY CO., LTD., Qingdao (CN)

(*) Notice: Subject to any disclaimer, the term of this patent is extended or adjusted under 35 U.S.C. 154(b) by 203 days.

(21) Appl. No.: 16/141,427

(22) Filed: Sep. 25, 2018

(65) Prior Publication Data

US 2019/0028464 A1 Jan. 24, 2019

Related U.S. Application Data

(63) Continuation of application No. PCT/CN2017/113646, filed on Nov. 29, 2017.

(30) Foreign Application Priority Data

Sep. 20, 2017 (CN) .......................... 2017 1 0855476

(51) Int. Cl.
  *H04L 29/06* (2006.01)
  *G06F 21/31* (2013.01)
(52) U.S. Cl.
  CPC .......... *H04L 63/0815* (2013.01); *G06F 21/31* (2013.01)
(58) Field of Classification Search
  CPC .............................. H04L 63/0815; G06F 21/31
  See application file for complete search history.

(56) References Cited

U.S. PATENT DOCUMENTS 7,930,411 B1 4/2011 Hayward
2003/0115484 A1* 6/2003 Moriconi ................ G06F 21/50
726/1
(Continued)

FOREIGN PATENT DOCUMENTS

CN 103188237 A 7/2013
CN 104539741 A 4/2015
(Continued)

OTHER PUBLICATIONS

International Search Report from PCT Application No. PCT/CN2017/113646 dated Jan. 22, 2018 (4 pages).
(Continued)

*Primary Examiner* — Michael R Vaughan
(74) *Attorney, Agent, or Firm* — Harness, Dickey & Pierce, P.L.C.

(57) ABSTRACT

The disclosure provides a method for logging into an account on a mobile device, a mobile device and a non-transitory computer-readable storage medium, and relates the field of mobile devices. The method includes: in response to a login instruction for logging into a first application, searching for multiple accounts of multiple second applications associated with the first application on the mobile device, where the first application is different from the multiple second applications; in response to two or more accounts are found, displaying a first prompt, where the first prompt presents the two or more accounts of the second applications available for selection; and, in response to a user's selection of one account selected from the two or more accounts of the multiple second applications, logging into the first application according to the selected account. Since when two or more accounts are found, a first prompt presenting the two or more accounts available for selection (Continued)

could be displayed, thus improving the flexibility of account login and user viscosity.

17 Claims, 3 Drawing Sheets

(56) References Cited

U.S. PATENT DOCUMENTS

| | | | | |
|---|---|---|---|---|
| 2011/0126280 | A1* | 5/2011 | Asano | G06F 21/32 |
| | | | | 726/19 |
| 2012/0278201 | A1* | 11/2012 | Milne | G06Q 20/3224 |
| | | | | 705/26.41 |
| 2012/0291114 | A1* | 11/2012 | Poliashenko | H04L 9/321 |
| | | | | 726/8 |
| 2013/0086657 | A1* | 4/2013 | Srinivasan | H04L 9/3234 |
| | | | | 726/6 |
| 2015/0012987 | A1* | 1/2015 | Tian | H04L 67/02 |
| | | | | 726/6 |
| 2016/0080293 | A1* | 3/2016 | Singh | H04L 51/046 |
| | | | | 715/752 |
| 2017/0192764 | A1* | 7/2017 | Cayre | H04L 67/02 |
| 2018/0314817 | A1* | 11/2018 | Gadde | G06F 21/604 |

FOREIGN PATENT DOCUMENTS

| | | |
|---|---|---|
| CN | 104580406 A | 4/2015 |
| CN | 105072133 A | 11/2015 |
| CN | 105338005 A | 2/2016 |
| CN | 107370772 A | 11/2017 |

OTHER PUBLICATIONS

Written Opinion PCT Application No. PCT/CN2017/113646 dated Jan. 22, 2018 (5 pages).
Office Action from Chinese Application No. 201710855476.7 dated Apr. 15, 2019 (8 pages).

* cited by examiner

METHOD FOR LOGGING INTO ACCOUNT ON MOBILE DEVICE, MOBILE DEVICE, AND NON-TRANSITORY COMPUTER READABLE STORAGE MEDIUM

CROSS-REFERENCE TO RELATED APPLICATIONS

This application is a continuation of International Application No. PCT/CN2017/113646 filed Nov. 29, 2017, which claims the benefit and priority of Chinese Patent Application No. CN201710855476.7 filed Sep. 20, 2017. The entire disclosures of the above applications are incorporated herein by reference.

FIELD

The present disclosure relates to the field of mobile devices, and particularly to a method for logging into an account on a mobile device, a mobile device and a non-transitory computer readable storage medium.

BACKGROUND

This section provides background information related to the present disclosure which is not necessarily prior art.

As technology develops, applications installed on mobile devices are having diverse functions, and various application login modes are emerging. One of these modes may be as follows: a user can log into a first application by logging into an account of a second application when the first application is running. For example, the first application is XX and the second application is YY. When the application XX is running, the user may log into the application XX by logging into the account of the application YY.

SUMMARY

This section provides a general summary of the disclosure, and is not a comprehensive disclosure of its full scope of all of its features.

An embodiment of the present disclosure provides a method for logging into an account on a mobile device, a mobile device and a non-transitory computer-readable storage medium. The technical solutions are as follow.

In a first aspect, the embodiment of the disclosure provides a method for logging into an account on a mobile device. The method includes: in response to a login instruction for logging into a first application, searching for multiple accounts of multiple second applications associated with the first application on the mobile device, where the first application is different from the multiple second applications and the multiple second applications are the same; in response to two or more accounts are found, displaying a first prompt, where the first prompt presents the two or more accounts of the second applications available for selection; and, in response to a user's selection of one account selected from the two or more accounts of the multiple second applications, logging into the first application according to the selected account.

In an implementation, displaying the first prompt includes: obtaining first login information, where the first login information indicates logging into the first application according to an account of a second application running in a running space same as a running space of the first application; in response to a loop identifier included by the first login information being a first identifier, processing the first login information to obtain one or more pieces of second login information, where the one or more pieces of second login information correspond to one or more second applications, respectively, and the one or more second applications run in one or more running spaces different from the running space of the first application; and, displaying the first prompt according to both the first login information and the one or more pieces of second login information.

In an implementation, processing the first login information to obtain the one or more pieces of second login information includes: copying the first login information according to the number of the one or more second applications running in the one or more running spaces different from the running space of the first application to obtain one or more pieces of third login information; obtaining one or more running space identifiers and one or more accounts for each one of the one or more second applications; and, replacing one or more running space identifiers and one or more accounts in each of the one or more pieces of third login information with the obtained one or more running space identifiers and one or more accounts of the one or more second applications to obtain the one or more pieces of second login information.

In an implementation, after processing the first login information to obtain the one or more pieces of second login information, the method further includes: changing the loop identifier included in the first login information to a second identifier; and, changing one or more loop identifiers included in the one or more pieces of second login information to one or more second identifiers.

In an implementation, displaying the first prompt includes: creating display information for interface based on both the first login information and the one or more pieces of second login information; and, displaying the first prompt based on the display information, where the first prompt includes the two or more accounts.

In an implementation, before searching for the multiple accounts of the multiple second applications associated with the first application on the mobile device, the method further includes: determining whether the multiple second applications are able to run simultaneously on the mobile device.

In an implementation, determining whether the multiple second applications are able to run simultaneously includes: checking through multiple processes running in multiple running spaces to find two or more second applications running simultaneously.

In an implementation, determining whether multiple second applications are able to run simultaneously includes: determining whether a multi-login identifier associated with the second application is a preset value, where the multi-login identifier is set to the preset value when a second application is started while another second application is running.

In a second aspect, the embodiment of the disclosure provides a mobile device. The mobile device includes a memory and a processor. The memory is configured to have computer instructions stored thereon, and the processor is configured to execute the computer instructions to cause the mobile device to perform operations of: in response to a login instruction for logging into a first application, searching for multiple accounts of multiple second applications associated with the first application on the mobile device, where the first application is different from the multiple second applications and the multiple second applications are the same; in response to two or more accounts are found, displaying a first prompt, where the first prompt presents the two or more accounts of the second applications available for selection; and, in response to a user's selection of one account selected from the two or more accounts of the multiple second applications, logging into the first application according to the selected account.

In an implementation, displaying the first prompt includes: obtaining first login information, where the first login information indicates logging into the first application according to an account of a second application running in a running space same as a running space of the first application; in response to a loop identifier included by the first login information being a first identifier, processing the first login information to obtain one or more pieces of second login information, where the one or more pieces of second login information correspond to one or more second applications, respectively, and the one or more second applications run in one or more running spaces different from the running space of the first application; and, displaying the first prompt according to both the first login information and the one or more pieces of second login information.

In an implementation, processing the first login information to obtain the one or more pieces of second login information includes: copying the first login information according to the number of the one or more second applications running in the one or more running spaces different from the running space of the first application to obtain one or more pieces of third login information; obtaining one or more running space identifiers and one or more accounts for each one of the one or more second applications; and, replacing one or more running space identifiers and one or more accounts in each of the one or more pieces of third login information with the obtained one or more running space identifiers and one or more accounts of the one or more second applications to obtain the one or more pieces of second login information.

In an implementation, the processor is further configured to execute the computer instructions to cause the terminal to perform operations of: after processing the first login information to obtain the one or more pieces of second login information, changing the loop identifier included in the first login information to a second identifier; and, changing one or more loop identifiers included in the one or more pieces of second login information to one or more second identifiers.

In an implementation, displaying the first prompt includes: creating display information for interface based on both the first login information and the one or more pieces of second login information; and, displaying the first prompt based on the display information, where the first prompt includes the two or more accounts.

In an implementation, before searching for the multiple accounts of the multiple second applications associated with the first application on the mobile device, the processor is further configured to execute the computer instructions to cause the mobile device to perform an operation of: determining whether the multiple second applications are able to run simultaneously on the mobile device.

In an implementation, determining whether the multiple second applications are able to run simultaneously includes: checking through multiple processes running in multiple running spaces to find two or more second applications running simultaneously.

In an implementation, determining whether multiple second applications are able to run simultaneously includes: determining whether a multi-login identifier associated with the second application is a preset value, where the multi-login identifier is set to the preset value when a second application is started while another second application is running.

On a third aspect, the embodiment of the disclosure provides a non-transitory computer-readable storage medium. The non-transitory computer-readable storage medium has computer instructions stored thereon. When the computer instructions are executed by a processor, the processor performs the operations of any of the methods according to the first aspect.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1:
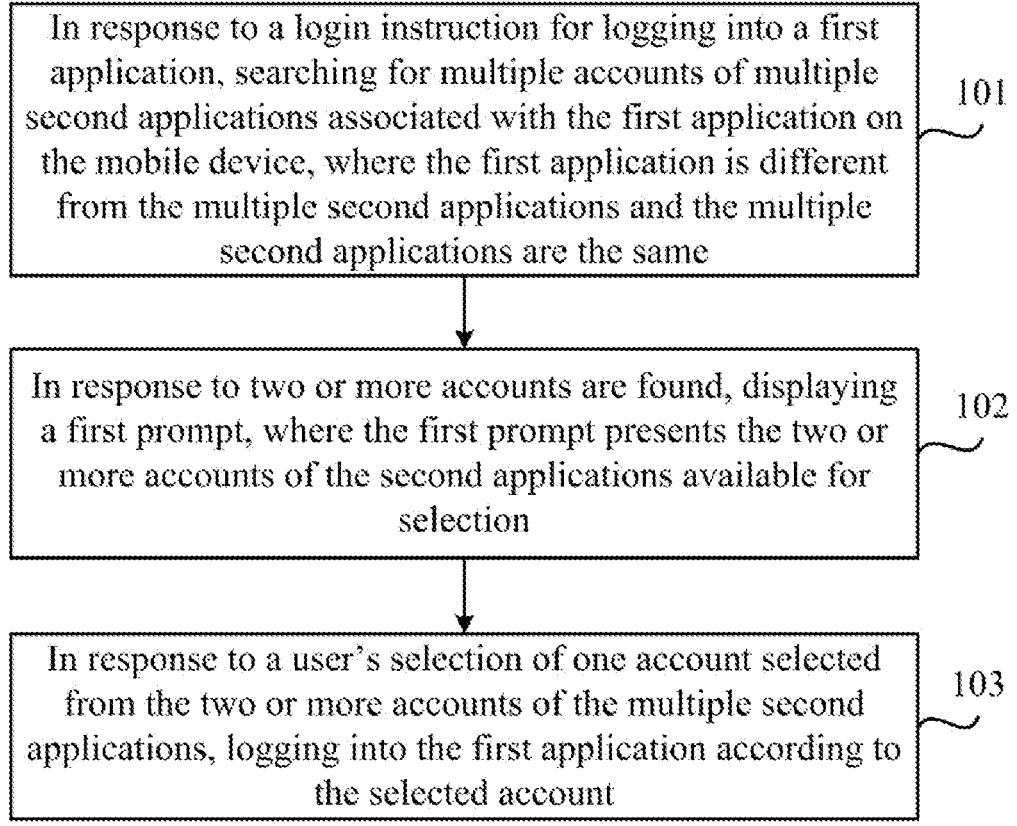
FIG. 1 is a flowchart of a method for logging into an account according to the embodiment of the present disclosure.

Example embodiments will now be described more fully with reference to the accompanying drawings.

Among existing technologies, most mobile devices can support application multi-login, that is, multiple identical applications can be installed on a mobile device concurrently. In such a case, the mobile device may allocate running spaces to the multiple applications, respectively, to run processes corresponding to the multiple applications. If multiple identical second applications are installed on the mobile device, when a user needs to log into a first application by logging into an account of one of the multiple second applications, the mobile device needs to determine a second application whose process is in a running space same as a running space of a process of the first application, and then logs into the first application by logging into an account of the determined second application.

However, when multiple identical second applications are installed on the mobile device (for convenience of description, the multiple second applications installed on the mobile device are referred to as an application multi-login group), a user may not want to log into the first application by logging into the account of the second application whose process is in the running space same as the running space of the process of the first application, but wants to log into the first application by logging into an account of another second application in the application multi-login group. However, as mentioned before, since the mobile device can only determine the second application whose process is in the running space same as the running space of the process of the first application, the user cannot select a preferred account for login, thus reducing flexibility of account login and user viscosity.

The advantageous effects of the technical solutions according to the embodiment of the present disclosure at least include the following: according to the embodiment of the present disclosure, in response to a login instruction for logging into a first application, multiple accounts of multiple second applications associated with the first application on the mobile device can be searched for; if two or more accounts are found, in order for the user to select a preferred account for login, a first prompt presenting the two or more accounts of the second applications available for selection may be displayed; and upon reception of a user's selection of one account selected from the two or more accounts of the multiple second applications, the first application is logged into according to the selected account. That is, the user can select a preferred account to log into the first application, thereby improving flexibility of account login and user viscosity.

In order to make objects, technical solutions and advantages of the present disclosure clearer, the embodiment of the present disclosure is described in detail below with reference to the accompanying drawings.

Before explaining the embodiment of the present disclosure in detail, firstly an application scenario the embodiment of the present disclosure involves with is introduced below.

Among existing technologies, when a mobile device needs to log into a first application when running the first application, the mobile device may log into the first application by logging into an account of a second application. For example, when the mobile device needs to log in an application XX when running the application XX, the mobile device may log into the application XX by logging into an account of an application YY. However, when multiple identical second applications are installed on the mobile device, the mobile device obtains an account of a second application whose process is running in a running space same as a running space of the process of the first application, and then logs into the first application by logging into the obtained account of the second application, but cannot log into the first application by logging into another account of another second application. As such, the user cannot choose a preferred account to log into the first application, thus reducing flexibility of account login and user viscosity. In view of this challenge, the embodiment of the present disclosure provides a method for logging into an account on a mobile device for improving the flexibility of account login and the user viscosity.

After the application scenario of the embodiment of the present disclosure is introduced, the method for logging into an account on a mobile device according to the embodiment of the present disclosure is described below in detail with reference to the accompanying drawings.

FIG. 1 is a flowchart of the method for logging into an account on a mobile device according to the embodiment of the present disclosure. As illustrated by FIG. 1, the method includes the following operations 101-103.

Operation 101: in response to a login instruction for logging into a first application, searching for multiple accounts of multiple second applications associated with the first application on the mobile device. The first application is different from the multiple second applications and the multiple second applications are the same.

More and more mobile devices support application multi-login. In some implementations, application multi-login refers to that two or more identical second applications are installed on a mobile device and each second application corresponds to one user space. For example, the mobile device logs into three second applications through three accounts a, b and c, respectively, and the three second applications correspond to three independent user spaces a1, b1 and c1, respectively. As such, the mobile device needs to judge whether two or more identical second applications can run simultaneously. The mobile device may check through multiple processes running in multiple running spaces to find two or more second applications running simultaneously. Of course, in practice, the mobile device may also determine whether two or more identical second applications can run simultaneously by other means. For example, when a second application is started while another second application is running, the mobile device may set a multi-login identifier to a preset value, and when detecting that the multi-login identifier is set to the preset value, the mobile device determines that two or more identical second applications can run simultaneously.

Since two or more identical second applications associated with the first application are running simultaneously, the mobile device needs to search for the accounts of the two or more second applications.

It should be noted that the login instruction is configured for indicating logging into the first application by logging into an account of a second application. The login instruction may be triggered by a user through a specified operation such as a click operation, a slide operation, a voice operation, and etc.

Operation 102: in response to two or more accounts are found, displaying a first prompt. The first prompt presents the two or more accounts of the second applications available for selection.

It can be seen from the description above that the mobile device may run two or more identical second applications associated with the first application simultaneously, therefore, the mobile device may find two or more accounts. In the case of finding two or more accounts, the mobile device may display the first prompt to provide an opportunity for the user to choose from the two or more accounts to log into the first application. The operation of displaying the first prompted by the mobile device may be implemented through the following operations A to C.

Operation A is obtaining first login information. The first login information indicates logging into the first application according to an account of a second application running in a running space same as a running space of the first application.

In order to log into the first application by logging into an account of a second application, the mobile device usually obtains information (i.e., the first login information) about the second application whose process is running in the running space running as the running space of the process of the first application. The first login information may include a name of the second application in the running space same as the running space of the first application and a request for logging into the first application by logging into the account of the second application in the running space same as running space of the first application. That is, the first login information indicates logging into the first application according to the account of the second application running in the running space same as the running space of the first application.

In an implementation, the mobile device may obtain the first login information by the following operations: the mobile device calls a startActivity interface of an operating system installed on the mobile device to attempt to start a user account authorization interface of the second application in the running space same as the running space of the first application; when the processing process goes to an ActivityStarter, the mobile device packs the information about the second application to be started into an intent object which is the first login information.

Operation B is: in response to a loop identifier included by the first login information being a first identifier, processing the first login information to obtain one or more pieces of second login information. The one or more pieces of second login information correspond to one or more second applications, respectively, and the one or more second applications run in one or more running spaces different from the running space of the first application.

When two or more second applications can run concurrently on the mobile device and the loop identifier included in the first login information is the first identifier, running spaces of all running processes of one or more second applications are independent of the running space of the running process of the first application. Therefore, in order to present one or more accounts of the one or more second applications to the user for selection, instead of directly logging into the first application according to the account of the second application running in the same running space as the first application, the mobile device needs to intercept the first login information, and then process the first login information. And the mobile device may process the first login information to obtain the one or more pieces of second login information through the following operations: copying the first login information according to the number of the one or more second applications running in the one or more running spaces different from the running space of the first application to obtain one or more pieces of third login information; obtaining one or more running space identifiers of the one or more running spaces where one or more processes of the one or more second applications are running, and obtaining one or more accounts for each one of the one or more second applications; and, replacing one or more running space identifiers and one or more accounts in each of the one or more pieces of third login information with the obtained one or more running space identifiers and one or more accounts of the one or more second applications to obtain the one or more pieces of second login information.

It should be noted that the loop identifier is configured to indicate whether to log into the first application based on already obtained login information, where the already obtained login information refers to information about the second application whose process is running in the running space running as the running space of the process of the first application, such as the name of the second application in the running space same as the running space of the first application. The first identifier is configured to indicate that the first application cannot be directly logged into based on the already obtained login information. The first identifier may be an English word, a number, and etc. For example, the first identifier may be the word "false" or the number "0". Of course, the first identifier may also be another character.

Herein, since each of the one or more pieces of third login information is obtained by copying the first login information and the content of each of the one or more pieces of third login information is the same as the content of the first login information, in order to obtain information about each of the one or more second applications, the mobile device needs to replace the one or more space identifiers included in the one or more pieces of third login information with the obtained one or more space identifiers and replace the one or more accounts included in the one or more pieces of third login information with the obtained one or more accounts to obtain one or more pieces of second login information.

In addition, the one or more running spaces corresponding to the one or more running processes of the one or more second application may be created when the mobile device runs the one or more second applications. When the mobile device creates the one or more running spaces corresponding to the one or more running processes of the one or more second applications, a space identifier may be allocated for each running space, and the one or more space identifiers may be stored in a database. Therefore, the mobile device may obtain the one or more space identifiers of the one or more running spaces where the one or more running processes of the one or more second applications run from the stored database. Since each account for logging into a second application is stored in a running space corresponding to a running process of the second application, the mobile device may obtain the one or more accounts from the one or more running spaces corresponding to the running processes of the one or more second application.

It should be noted that, each space identifier is configured to uniquely identify a running space corresponding to a running process of one of the one or more second applications. Each space identifier may be a time when one of the one or more second application is started, a startup sequence, and the like. In addition, the one or more space identifiers of the one or more running spaces corresponding to the one or more running processes of the one or more second application may be stored in the database as a list, or may be recorded in another form in the database.

It should also be noted that the database may be a settings database. The settings database is configured to manage common settings of the mobile device, such as a ringtone and a sound volume, so as to ensure that the settings of the mobile device when the mobile device is powered on in a next time are consistent with settings when the mobile device is powered off previously.

Furthermore, since the loop identifier is configured to indicate whether to log into the first application based on the obtained login information and the first identifier is configured to indicate that the first application cannot be directly logged into based on the obtained login information, when the loop identifier is the first identifier, the mobile device cannot log into the first application by using the obtained login information, but repeats performing the operation 102. Therefore, for allowing the mobile device to log into the first application based on the obtained login information successfully, after the mobile device processes the first login information to obtain the one or more pieces of second login information, the loop identifier included in the first login information may be changed to a second identifier, and one or more loop identifiers included in the one or more pieces of second login information may be changed to one or more second identifiers, to prevent the mobile device from repeating the operation A.

It should be noted that, the second identifier is configured to indicate that the first application may be logged into directly based on an account in the obtained login information, and the second identifier may be an English word or a number. For example, the second identifier may be a word "true" or a number "1", and of course, the second identifier may also be another character.

In addition, when the mobile device does not run the one or more second applications, but runs the second application in the same running space as the first application, no matter the loop identifier included in the first login information is the first identifier or not, the mobile device logs into the first application based on the first login information. When two or more second applications are simultaneously running in the mobile device and the loop identifier included in the first login information is the second identifier, since the second identifier is configured to indicate that the first application can be directly logged into based on the obtained login information, the mobile device also logs into the first application based on the first login information.

Operation C is displaying the first prompt according to both the first login information and the one or more pieces of second login information.

Herein, the mobile device may create display information for interface based on both the first login information and the one or more pieces of second login information, and display the first prompt based on the display information, where the first prompt includes the two or more accounts.

Since the mobile device may need to perform a human-machine interaction with a user through various installed applications, the mobile device may display some interactive interfaces to implement different human-machine interactions when needed. Therefore, the mobile device may store information capable of displaying a human-machine interface, and in order to allow the user to select a preferred account to log into the first application, the mobile device may add the first login information and the one or more pieces of second login information to the information of the man-machine interface to obtain the display information, so that the mobile device can display a user selection interface according to the display information.

When the mobile device displays the user selection interface according to the display information, the mobile device can obtain the first login information and the one or more pieces of second login information from the display information through a getExtra function, so as to display the user selection interface. That is, the mobile device can obtain the first login information through getExtra ("first login information") and display, on the user selection interface according to the first login information, the first login information of the second application in the same running space as the first application; the mobile device can also obtain one or more pieces of second login information corresponding to the one or more second application through getExtra ("second login information"), and display on the user selection interface, two or more accounts corresponding to the two or more second applications according to the first login information and according to the one or more pieces of second login information.

Operation 103: in response to a user's selection of one account selected from the two or more accounts of the multiple second applications, logging into the first application according to the selected account.

It should be noted that the selection may be triggered by the user through a specified operation.

In addition, when receiving a user's selection based on the first prompt, the mobile device may obtain login information corresponding to the selected account indicated by the selection and log into the first application through startActivity.

Furthermore, in this embodiment of the present disclosure, the mobile device may not only log into the first application in the foregoing manner, but may also log into the first application by other means. For example, the mobile device may obtain an account for logging into the first application according to a selection history, and log into the first application according to the account determined according to the selection history. That is, the mobile device may obtain from the selection history an account selected by the user when the user logged into the first application most recently, or the mobile device may obtain from the selection history an account selected most often by the user. In addition, when a second application logged into through the obtained account is running, the mobile device can log into the first application directly according to the obtained account. When no second application logged into through the obtained account is running, the mobile device can display a user selection interface for selection by the user.

In addition, after obtaining an account from the selection history, the mobile device may further display a second prompt configured to ask the user whether to log into the first application according to the obtained account. When receiving a confirmation instruction instructing to log into the first application using the obtained account, the mobile device logs into the first application based on the obtained account. When receiving a cancellation instruction instructing not to log into the first application according to the obtained account, the mobile device may display the first prompt for selection by the user.

It should be noted that the confirmation instruction is configured to instruct to log into the first application according to an account obtained by the mobile device from the selection history, and the confirmation instruction may be triggered by the user through a specified operation. The cancellation instruction is configured to instruct not to log into the first application according to the account be obtained by the mobile device according to the selection history, and the cancellation instruction can also be triggered by the user through a specified operation.

According to the embodiment of the present disclosure, after the mobile device detects the login instruction for logging into the first application, if two or more accounts are found, the mobile device may obtain the first login information so that the user may select a preferred account to log into the first application. Since the first login information indicates logging into the first application according to the account of the second application running in the running space same as the running space of the first application, in response to the loop identifier included in the first login information being the first identifier, the mobile device may process the first login information to obtain the one or more pieces of second login information. Since the one or more running processes of the one or more second applications are run in one or more running spaces different from the running space of the running process of the first application, the mobile device may obtain login information corresponding to the one or more second application by processing the first login information. As such, after the login information corresponding to each of the two or more second applications is obtained, the mobile device may display the first prompt based on the first login information and the one or more pieces of second login information, so that the user may select a preferred account to log into the first application according to the two or more accounts presented by the first prompt, thereby increasing the flexibility of account login and the user viscosity.

After the method for logging into an account on a mobile device according to the embodiment of the present disclosure is explained, the mobile device for logging into an account according to the present disclosure is described below.

Figure 2A:
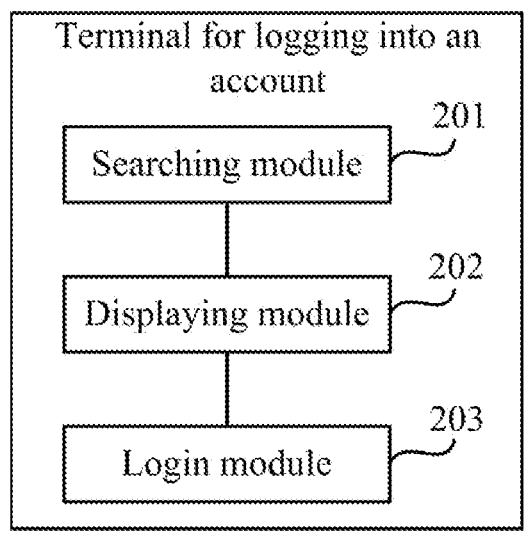
FIG. 2A is a schematic structural diagram of an apparatus for logging into an account according to the embodiment of the present disclosure.

FIG. 2A is a block diagram of a mobile device for logging into an account according to the embodiment of the present disclosure. As illustrated by FIG. 2A, the mobile device for logging into an account may be implemented by software, hardware, or a combination of both. The mobile device includes a searching module 201, a displaying module 202, and a login module 203.

The searching module 201 is configured to search for multiple accounts of multiple second applications associated with a first application on the mobile device, in response to a login instruction for logging into the first application. The first application is different from the multiple second applications and the multiple second applications are the same.

The displaying module 202 is configured to display a first prompt in response to two or more accounts are found. The first prompt presents the two or more accounts of the second applications available for selection.

The login module 203 is configured to log into the first application according to a selected account, in response to a user's selection of one account selected from the two or more accounts of the multiple second applications.

Figure 2B:
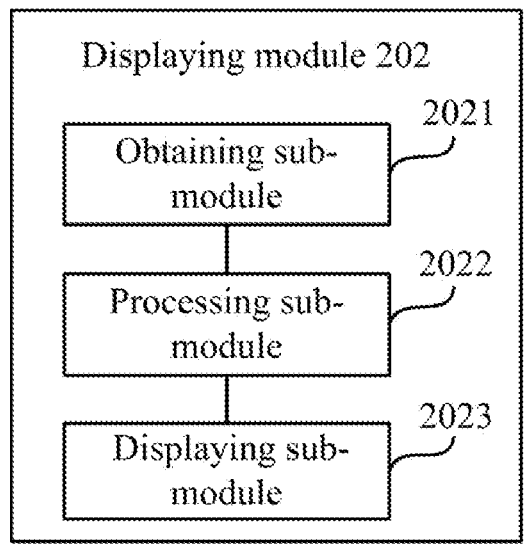
FIG. 2B is a schematic structural diagram of a displaying module according to the embodiment of the present disclosure.

In an implementation, referring to FIG. 2B, the displaying module 202 includes an obtaining sub-module 2021, a processing sub-module 2022 and a displaying sub-module 2023.

The obtaining sub-module 2021 is configured to obtain first login information. The first login information indicates logging into the first application according to an account of a second application running in a running space same as a running space of the first application.

The processing sub-module 2022 is configured to process the first login information to obtain one or more pieces of second login information, in response to a loop identifier included by the first login information being a first identifier. The one or more pieces of second login information correspond to one or more second applications, respectively, and the one or more second applications run in one or more running spaces different from the running space of the first application.

The displaying sub-module 2023 is configured the first prompt according to both the first login information and the one or more pieces of second login information.

In an implementation, the processing sub-module 2022 is configured to copy the first login information according to the number of the one or more second applications running in the one or more running spaces different from the running space of the first application to obtain one or more pieces of third login information; obtain one or more running space identifiers and one or more accounts for each one of the one or more second applications; and one or more running space identifiers and one or more accounts in each of the one or more pieces of third login information with the obtained one or more running space identifiers and one or more accounts of the one or more second applications to obtain the one or more pieces of second login information.

Figure 2C:
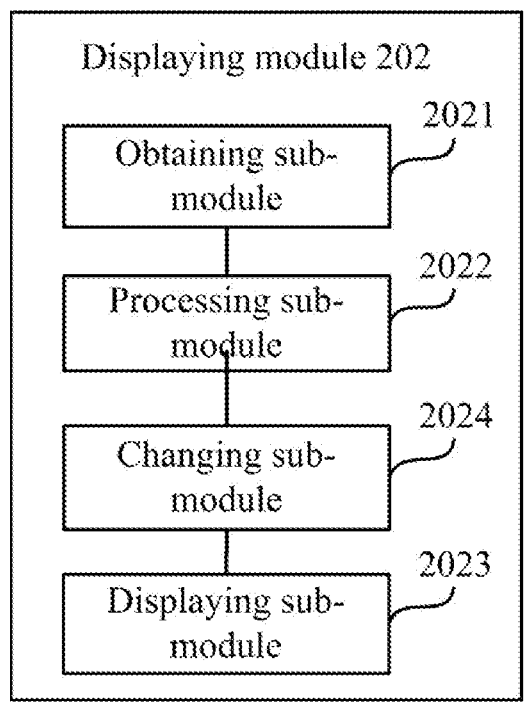
FIG. 2C is a schematic structural diagram of another displaying module according to the embodiment of the present disclosure.

In an implementation, referring to FIG. 2C, the displaying module 202 further includes a changing sub-module 2024 configured to change the loop identifier included in the first login information to a second identifier and change one or more loop identifiers included in the one or more pieces of second login information to one or more second identifiers.

In an implementation, the displaying sub-module 2023 is configured to: create display information for interface based on both the first login information and the one or more pieces of second login information; and display the first prompt based on the display information. The first prompt includes the two or more accounts.

According to the embodiment of the present disclosure, after the mobile device detects the login instruction for logging into the first application, if two or more accounts are found, the mobile device may obtain the first login information so that the user may select a preferred account to log into the first application. Since the first login information indicates logging into the first application according to the account of the second application running in the running space same as the running space of the first application, in response to the loop identifier included in the first login information being the first identifier, the mobile device may process the first login information to obtain the one or more pieces of second login information. Since the one or more running processes of the one or more second applications are run in one or more running spaces different from the running space of the running process of the first application, the mobile device may obtain login information corresponding to the one or more second application by processing the first login information. As such, after the login information corresponding to each of the two or more second applications is obtained, the mobile device may display the first prompt based on the first login information and the one or more pieces of second login information, so that the user may select a preferred account to log into the first application according to the two or more accounts presented by the first prompt, thereby increasing the flexibility of account login and the user viscosity.

It should be noted that the mobile device for logging into an account according to the foregoing embodiment is only illustrated by taking division of the foregoing functional modules as an example. In practice, the foregoing functions may be allocated to and performed by different functional modules as needed. That is, the internal structure of the mobile device can be divided into different functional modules to accomplish all or part of the functions described above. In addition, the mobile device for logging into an account and the method for logging into an account on a mobile device according to the foregoing embodiment are based on the same inventive concept. For the specific implementation of the mobile device for logging into an account, reference may be made to descriptions of the method, and thus details are not described herein again.

Figure 3:
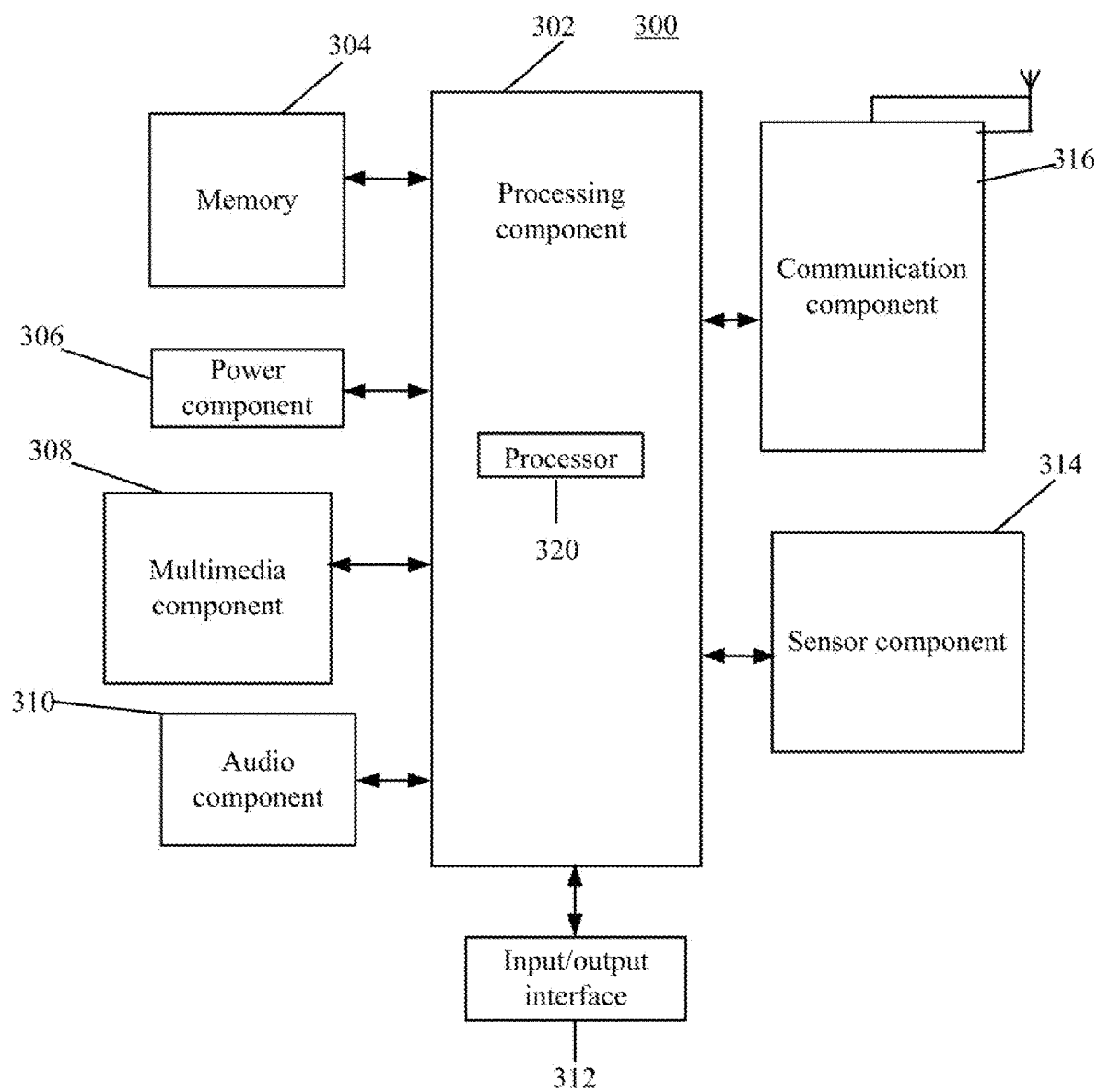
FIG. 3 is a schematic structural diagram of a mobile device according to the embodiment of the present disclosure.

FIG. 3 is a structural block diagram of a mobile device according to the embodiment of the disclosure. For example, the mobile device may be a mobile phone, a computer, a digital broadcast mobile device, a messaging device, a game console, a tablet device, a medical device, a fitness device or a personal digital assistant.

Referring to FIG. 3, the mobile device may include one or more of the following components: a processing component 302, a memory 304, a power component 306, a multimedia component 308, an audio component 310, an input/output (I/O) interface 312, a sensor component 314, and a communication component 316.

The processing component 302 generally controls the overall operation of the mobile device, such as operations associated with display, telephone calls, data communications, camera operations, and recording operations. The processing component 302 may include one or more processors 320 to execute instructions to perform all or part of the operations of the method described above. In addition, the processing component 302 may include one or more modules to facilitate the interaction between the processing component 302 and other components. For example, the processing component 302 may include a multimedia module to facilitate interaction between the multimedia component 308 and the processing component 302.

The memory 304 is configured to store various types of data to support operations of the mobile device. Examples of such data include instructions for any application or method operating on the mobile device, contact data, phone book data, messages, pictures or videos. The memory 304 may be implemented by any type of volatile or non-volatile storage devices or combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk.

The power component 306 provides power for the various components of the mobile device. The power component 306 may include a power management system, one or more power supplies, and other components associated with functions of generating, managing, and distributing power for the mobile device.

The multimedia component 308 includes a screen providing an output interface between the mobile device and a user. In some implementations, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense a boundary of a touch or slide action, but also detect duration and pressure associated with the touch or slide operation. In some implementations, the multimedia component 308 includes a front-facing camera and/or a back-facing camera. When the mobile device is in an operation mode, such as a camera mode or a video mode, the front-facing camera and/or the back-facing camera can receive external multimedia data. Each front-facing camera and back-facing camera can be a fixed optical lens system or has focal length and an optical zoom capability.

The audio component 310 is configured to output and/or input audio signals. For example, the audio component 310 includes a microphone (MIC) that is configured to receive external audio signals when the mobile device is in an operating mode, such as a call mode, a recording mode, or a voice recognition mode. The received audio signals may be further stored in the memory 304 or sent via the communication component 316. In some implementations, the audio component 310 further includes a speaker to output the audio signals.

The I/O interface 312 provides an interface between the processing component 302 and a peripheral interface module which may be a keyboard, a click wheel or a button. These buttons may include, but are not limited to, a home button, a volume button, a start button, and a lock button.

The sensor component 314 includes one or more sensors for providing the mobile device with status assessments from various aspects. For example, the sensor component 314 may sense the powering on/powering off status of the mobile device and the relative positioning of components which are, for example, a display and a keypad of the mobile device. The sensor component 314 may also sense a change in the position of the mobile device or a component of the mobile device, the presence or absence of contact between the user and the mobile device, the orientation or the acceleration/deceleration and the temperature change of the mobile device. The sensor component 314 may include a proximity sensor configured to sense the presence of nearby objects in the case of no any physical contact. The sensor component 314 may also include an optical sensor, such as a charge-coupled device (CCD) image sensor or a complementary metal-oxide-semiconductor (CMOS) image sensor, for use in imaging applications. In some implementations, the sensor component 314 may further include an acceleration sensor, a gyroscope sensor, a magnetic sensor, a pressure sensor, or a temperature sensor.

The communication component 316 is configured to facilitate wired or wireless communication between the mobile device and other devices. The mobile device may access a wireless network based on a communication standard, such as WiFi, 2G or 3G, or a combination thereof. In one exemplary embodiment, the communication component 316 receives a broadcast signal or broadcast related information from an external broadcast management system via a broadcast channel. In one exemplary embodiment, the communication component 316 also includes a near field communication (NFC) module to facilitate short range communication. For example, the NFC module may be implemented based on radio frequency identification (RFID) technology, infrared data association (IrDA) technology, ultra-wideband (UWB) technology, Bluetooth (BT) technology, and other technologies.

In an exemplary embodiment, the mobile device may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components, for performing the method according to the embodiment shown in FIG. 1.

The above-mentioned embodiment may be implemented in whole or in part by software, hardware, firmware, or any combination thereof. When implemented by software, it may be implemented in whole or in part in the form of a computer program product. The computer program product includes one or more computer instructions. When the computer instructions are loaded into and executed by a computer, the processes or functions according to the embodiments of the present disclosure are generated in whole or in part. The computer may be a general purpose computer, a special purpose computer, a computer network, or other programmable mobile devices. The computer instructions may be stored in a computer-readable storage medium or transferred from one computer-readable storage medium to another, for example, from one website, a computer, a server, or a data center to another website, computer, server, or data center in a wired mode (such as through coaxial cables, optical fibers, Digital Subscriber Lines (DSL) or in a wireless mode (such as through infrared rays, radio, microwave, etc.) The computer-readable storage medium may be any available medium that can be accessed by a computer or a data storage device such as a server or a data center, that is integrated by one or more available media. The available medium may be a magnetic medium (such as a floppy disk, a hard disk and a magnetic tape), an optical medium such as a digital versatile disc (DVD), or a semiconductor medium such as a solid state disk (SSD).

Those of ordinary skill in the art should understand that all or part of operations of the above-mentioned embodiments may be implemented through hardware or may also be implemented by relevant hardware under instructions of programs, and the programs may be stored in one kind of computer readable storage medium. The above-mentioned storage medium may be a read-only memory, a magnetic disk or CD, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for logging into an account on a mobile device, comprising:
   in response to a login instruction for logging into a first application, searching for multiple accounts of multiple second applications associated with the first application on the mobile device, wherein the first application is different from the multiple second applications and the multiple second applications are the same;
   in response to two or more accounts are found, displaying a first prompt, wherein the first prompt presents the two or more accounts of the second applications available for selection; and
   in response to a user's selection of one account selected from the two or more accounts of the multiple second applications, logging into the first application according to the selected account.

2. The method according to claim 1, wherein displaying the first prompt comprises:
   obtaining first login information, wherein the first login information indicates logging into the first application according to an account of a second application running in a running space same as a running space of the first application;
   in response to a loop identifier comprised by the first login information being a first identifier, processing the first login information to obtain one or more pieces of second login information, wherein the one or more pieces of second login information correspond to one or more second applications, respectively, and the one or more second applications run in one or more running spaces different from the running space of the first application; and
   displaying the first prompt according to both the first login information and the one or more pieces of second login information.

3. The method according to claim 2, wherein processing the first login information to obtain the one or more pieces of second login information comprises:
   copying the first login information according to the number of the one or more second applications running in the one or more running spaces different from the running space of the first application to obtain one or more pieces of third login information;
   obtaining one or more running space identifiers and one or more accounts for each one of the one or more second applications; and
   replacing one or more running space identifiers and one or more accounts in each of the one or more pieces of third login information with the obtained one or more running space identifiers and one or more accounts of the one or more second applications to obtain the one or more pieces of second login information.

4. The method according to claim 2, after processing the first login information to obtain the one or more pieces of second login information, further comprising:
   changing the loop identifier included in the first login information to a second identifier; and
   changing one or more loop identifiers included in the one or more pieces of second login information to one or more second identifiers.

5. The method according to claim 2, wherein displaying the first prompt according to both the first login information and the one or more pieces of second login information comprises:
   creating display information for interface based on both the first login information and the one or more pieces of second login information; and
   displaying the first prompt based on the display information, wherein the first prompt comprises the two or more accounts.

6. The method according to claim 1, before searching for the multiple accounts of the multiple second applications associated with the first application on the mobile device, further comprising:
   determining whether the multiple second applications are able to run simultaneously on the mobile device.

7. The method according to claim 6, wherein determining whether the multiple second applications are able to run simultaneously comprises:
   checking through multiple processes running in multiple running spaces to find two or more second applications running simultaneously.

8. The method according to claim 6, wherein determining whether multiple second applications are able to run simultaneously comprises:
   determining whether a multi-login identifier associated with the second application is a preset value, wherein the multi-login identifier is set to the preset value when a second application is started while another second application is running.

9. A mobile device, comprising:
   a memory configured to have computer instructions stored thereon; and
   a processor configured to execute the computer instructions to cause the mobile device to perform operations of:
   in response to a login instruction for logging into a first application, searching for multiple accounts of multiple second applications associated with the first application on the mobile device, wherein the first application is different from the multiple second applications and the multiple second applications are the same;
   in response to two or more accounts are found, displaying a first prompt, wherein the first prompt presents the two or more accounts of the second applications available for selection; and
   in response to a user's selection of one account selected from the two or more accounts of the multiple second applications, logging into the first application according to the selected account.

10. The mobile device according to claim 9, wherein displaying the first prompt comprises:
    obtaining first login information, wherein the first login information indicates logging into the first application according to an account of a second application running in a running space same as a running space of the first application;

in response to a loop identifier comprised by the first login information being a first identifier, processing the first login information to obtain one or more pieces of second login information, wherein the one or more pieces of second login information correspond to one or more second applications, respectively, and the one or more second applications run in one or more running spaces different from the running space of the first application; and displaying the first prompt according to both the first login information and the one or more pieces of second login information.

11. The mobile device according to claim 10, wherein processing the first login information to obtain the one or more pieces of second login information comprises:

copying the first login information according to the number of the one or more second applications running in the one or more running spaces different from the running space of the first application to obtain one or more pieces of third login information;

obtaining one or more running space identifiers and one or more accounts for each one of the one or more second applications; and replacing one or more running space identifiers and one or more accounts in each of the one or more pieces of third login information with the obtained one or more running space identifiers and one or more accounts of the one or more second applications to obtain the one or more pieces of second login information.

12. The mobile device according to claim 10, wherein after processing the first login information to obtain the one or more pieces of second login information, the processor is further configured to execute the computer instructions to cause the mobile device to perform operations of:

changing the loop identifier included in the first login information to a second identifier; and changing one or more loop identifiers included in the one or more pieces of second login information to one or more second identifiers.

13. The mobile device according to claim 10, wherein displaying the first prompt according to both the first login information and the one or more pieces of second login information comprises:

creating display information for interface based on both the first login information and the one or more pieces of second login information; and displaying the first prompt based on the display information, wherein the first prompt comprises the two or more accounts.

14. The mobile device according to claim 9, wherein before searching for the multiple accounts of the multiple second applications associated with the first application on the mobile device, the processor is further configured to execute the computer instructions to cause the mobile device to perform an operation of:

determining whether the multiple second applications are able to run simultaneously on the mobile device.

15. The mobile device according to claim 14, wherein determining whether the multiple second applications are able to run simultaneously comprises:

checking through multiple processes running in multiple running spaces to find two or more second applications running simultaneously.

16. The mobile device according to claim 14, wherein determining whether multiple second applications are able to run simultaneously comprises:

determining whether a multi-login identifier associated with the second application is a preset value, wherein the multi-login identifier is set to the preset value when a second application is started while another second application is running.

17. A non-transitory computer-readable storage medium, having computer instructions stored thereon, wherein when the computer instructions are executed by a processor, the processor performs the operations of the method according to claim 1.

* * * * *